April 11, 1967 J. E. SHEPPARD 3,313,557
PIPE TRANSPORTING AND STORAGE DEVICE
Filed July 7, 1965
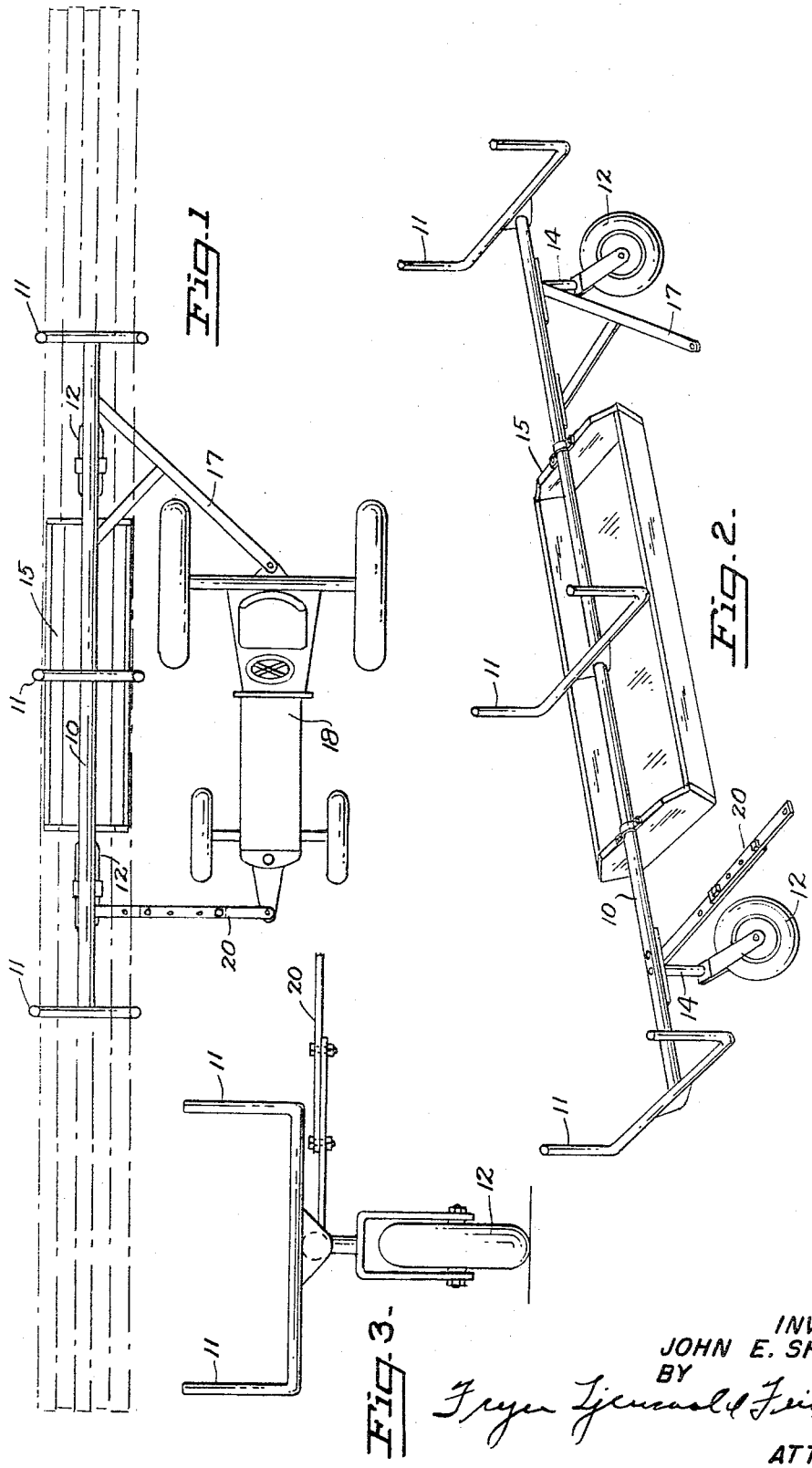
INVENTOR
JOHN E. SHEPPARD
BY
ATTORNEYS $$\text{3,313,557}$$
PIPE TRANSPORTING AND STORAGE DEVICE
John E. Sheppard, Hood River, Oreg., assignor to R. M. Wade & Co., Portland, Oreg., a corporation of Oregon
Filed July 7, 1965, Ser. No. 470,156
2 Claims. (Cl. 280—473)

This invention relates to the storage and transportation of pipe and was developed particularly for use in connection with pipe employed in sprinkler type irrigation systems.

In one kind of irrigation systems, lengths of aluminum pipe are coupled together to form a long line and sprinklers are disposed at spaced intervals throughout the length of the line. The line is charged with water to irrigate a narrow strip of land and when irrigation is complete, the line is disassembled and moved to a nearby location. This is repeated until an entire area is irrigated.

Moving of such a line is a tedious procedure as each length of pipe must be carried to a new location, usually about sixty feet away, where the new line is assembled.

It is the object of the present invention to provide a new pipe transportation device capable of being moved along a line at about the speed required for a man to uncouple and place the lengths of pipe on the device as well as to remove and recouple the lengths into a new line.

It is also an object of the present invention to provide such a device in a form that is suitable for storage of pipe in a position above the ground when the pipe is not in use.

Further and more specific objects and advantages of the invention and the manner in which it is carried into practice are made apparent in the following specification where reference is made to the accompanying drawing.

In the drawing:

FIG. 1 is a plan view of a pipe transporting device embodying the present invention illustrating the manner in which it is coupled to a tractor and showing in broken lines the position of pipe as it is being carried by the device;

FIG. 2 is a perspective view of the device with the pipe removed; and

FIG. 3 is a front elevational view of the device.

In FIGS. 1 and 2, the main body portion of the transporting device is shown as a tube 10 which has several U-shaped pipe racks 11 disposed in spaced alignment thereon and firmly secured thereto as by welding or the like. Casters 12 are pivotally connected to the tube 10 for supporting it in an elevated position with respect to the ground. The casters have telescoped pivotal connections as at 14 enabling them to trail as the direction of movement of the transporting device changes. A box shown at 15 is preferably supported beneath the tubular member 10 and serves for the transportation of small parts and tools while the pipe is being transported on the racks 11.

The device is adapted to be connected with a tractor as with a rigid horizontal Y-shaped bracket 17 extending outwardly from the tube 10 and connected to the rear of a tractor 18 as shown in FIG. 1. A connection is made with the forward end of the tractor by a bar 20 which is made of two perforated parts bolted together to enable adjustment of its length so that it is adaptable to tractors of different sizes. For example if a tractor shorter than that shown at 18 were used, the bar would be lengthened and inclined rearwardly toward the forward end of the tractor.

With the tractor operating at a very slow speed, a man can uncouple lengths of pipe from a long line and place them on the racks 11 to occupy the position illustrated in broken lines in FIG. 1. When the line has been completely disassembled or when the racks are full, the tractor can be driven to the location of the next line and driven slowly while a man removes the lengths of pipe and reassembles them. This saves a great deal of time in labor as it is not necessary for the man to walk twice the distance between the old line and the new line for every length of pipe to be moved. The tubular frame 10 is relatively short and the casters 12 closely spaced so that the tractor and transporting device can be turned on a very short radius though pipes twenty and thirty feet long can be easily transported.

When a sprinkler line is not in use, it is desirable to store the pipe above the ground where it is unlikely to be damaged and where small rodents cannot readily nest in the pipe leaving debris which causes trouble when it is next used. The device makes a convenient storage rack for pipe as the bracket 17 and bar 20 may be disconnected from the tractor and lowered to the ground. Even when the racks are full of pipe, one man can easily raise and lower these members because the weight of the pipe is equally distributed on opposite sides of the tubular body member 10.

I claim:

1. A device for transporting pipe or other long articles which comprises a long body having wheels, and means to connect the body to the rear end and to the front end of a tractor while it is disposed alongside and parallel to the tractor and in which the body is a single long tubular member with U-shaped brackets supported in spaced alignment thereon.

2. The device of claim 1 with a receptacle for miscellaneous articles suspended below the tubular member.

References Cited by the Examiner

UNITED STATES PATENTS

| | | | |
|---|---|---|---|
| 1,413,575 | 4/1922 | Cochran | 280—473 X |
| 1,444,125 | 2/1923 | Kirkpatrick et al. | 280—62 |
| 2,430,007 | 11/1947 | Evans | 280—473 X |
| 2,742,319 | 4/1956 | Tobin | 137—344 |

LEO FRIAGLIA, *Primary Examiner.*